(12) United States Patent
Komatsubara (10) Patent No.: US 11,134,656 B2
(45) Date of Patent: Oct. 5, 2021

(54) ABSORBENT ARTICLE FOR PET ANIMALS

(71) Applicant: UNICHARM CORPORATION, Shikokuchuo (JP)

(72) Inventor: Daisuke Komatsubara, Kanonji (JP)

(73) Assignee: UNICHARM CORPORATION, Ehime (JP)

( * ) Notice: Subject to any disclaimer, the term of this patent is extended or adjusted under 35 U.S.C. 154(b) by 536 days.

(21) Appl. No.: 15/773,127

(22) PCT Filed: Dec. 17, 2015

(86) PCT No.: PCT/JP2015/085370
§ 371 (c)(1),
(2) Date: May 2, 2018

(87) PCT Pub. No.: WO2017/077661
PCT Pub. Date: May 11, 2017

(65) Prior Publication Data
US 2018/0325082 A1 Nov. 15, 2018

(30) Foreign Application Priority Data
Nov. 5, 2015 (JP) .............................. JP2015-217568

(51) Int. Cl.
*A01K 23/00* (2006.01)
(52) U.S. Cl.
CPC .................................... *A01K 23/00* (2013.01)
(58) Field of Classification Search
CPC ... A01K 23/00; A61F 13/42; A61F 2013/422; A61F 2013/425; A61F 2013/426
(Continued)

(56) References Cited

U.S. PATENT DOCUMENTS 5,690,624 A * 11/1997 Sasaki ..................... A61F 13/42
604/361
6,307,119 B1 * 10/2001 Cammarota ............ A61F 13/42
604/361
(Continued)

FOREIGN PATENT DOCUMENTS

JP          2012-205576 A      10/2012
JP          5517916 B2           6/2014
WO     WO-2012164962 A1 * 12/2012 ............. A61D 99/00

OTHER PUBLICATIONS

International Search Report in PCT Application No. PCT/JP2015/085370, dated Jan. 26, 2016, 2pp.

*Primary Examiner* — Lisa L Tsang
(74) *Attorney, Agent, or Firm* — Hauptman Ham, LLP (57) ABSTRACT

An absorbent article for male pet animals has a longitudinal direction, a transverse direction and includes: a body-facing surface facing a body of a pet; a non-body-facing surface opposite to the body-facing surface; a first section positioned at a center in the longitudinal direction; second sections adjacent to the first section in the longitudinal direction; an interior layer sheet positioned on side of the body-facing surface; an exterior layer sheet positioned on side of the non-body-facing surface; an absorbent core between the interior and the exterior layer sheets; first and second end portions opposed to each other in the longitudinal direction; an attachment on which the second end portion is detachably attached, the attachment being positioned in the first end portion; and an indicator that is colored upon coming into contact with urine. The indicator continuously extends in the longitudinal direction, and is visually recognizable from the non-body-facing surface.

7 Claims, 11 Drawing Sheets (58) Field of Classification Search
USPC .................................. 119/867–69; 604/361
See application file for complete search history.

(56) References Cited

U.S. PATENT DOCUMENTS

| | | | |
|---|---|---|---|
| 10,543,129 B2* | 1/2020 | Strasemeier | A61F 13/42 |
| 2003/0158530 A1* | 8/2003 | Diehl | A61F 13/42 |
| | | | 604/361 |
| 2006/0025733 A1* | 2/2006 | Kikuchi | A61F 13/42 |
| | | | 604/361 |
| 2006/0224132 A1* | 10/2006 | Roe | A61F 13/42 |
| | | | 604/361 |
| 2008/0294134 A1* | 11/2008 | Schroer, Jr. | A61F 13/42 |
| | | | 604/361 |
| 2010/0168695 A1* | 7/2010 | Robles | A61F 13/42 |
| | | | 604/361 |
| 2010/0168701 A1* | 7/2010 | Schmidt | A61F 13/42 |
| | | | 604/361 |
| 2010/0305529 A1* | 12/2010 | Ashton | A61F 13/42 |
| | | | 604/361 |
| 2014/0083372 A1* | 3/2014 | Komatsubara | A01K 23/00 |
| | | | 119/850 |
| 2014/0109843 A1 | 4/2014 | Komatsubara et al. | |
| 2015/0173968 A1* | 6/2015 | Joseph | A61F 13/5323 |
| | | | 604/361 |
| 2015/0196009 A1* | 7/2015 | Komatsubara | A01K 23/00 |
| | | | 119/869 |
| 2015/0305309 A1* | 10/2015 | Qiu | A01K 23/00 |
| | | | 119/869 |
| 2016/0038628 A1* | 2/2016 | Klofta | A61L 15/20 |
| | | | 604/361 |

\* cited by examiner

ABSORBENT ARTICLE FOR PET ANIMALS

RELATED APPLICATIONS

The present application is a National Phase of PCT/JP2015/085370, filed Dec. 17, 2015, and claims priority to Japanese Patent Application No. 2015-217568, filed Nov. 5, 2015.

TECHNICAL FIELD

The present disclosure relates to an absorbent article that absorbs urine from pet animals such as cats and dogs.

BACKGROUND ART

Absorbent articles worn on the body of pet animals such as cats and dogs have conventionally been known. Patent Literature 1 discloses one example of such an absorbent article for pet animals. Specifically, this rectangular absorbent article has a longitudinal direction and a transverse direction, and includes a body-facing surface facing the body of a pet, a non-body-facing surface opposite to the body-facing surface, a first section positioned at the center in the longitudinal direction, second sections adjacent to the first section in the longitudinal direction, an interior layer sheet positioned on the body-facing surface, an exterior layer sheet positioned on the non-body-facing surface, and an absorbent core interposed between the interior and the exterior layer sheets.

CITATION LIST

Patent Literature

PTL 1: Japanese Unexamined Patent Application Publication No. 2012-205576 (JP2012-205576A)

SUMMARY OF INVENTION

Technical Problem

The absorbent article for pet animals disclosed in Patent Literature 1 includes indicators, colored upon coming into contact with urine from a pet, arranged at an interval along the longitudinal direction. Such an absorbent article is relatively expensive. Thus, usually, the article is exchanged when a large amount of urine is discharged without changing the article with a small amount of urine discharged. In this context, the configuration of the absorbent article disclosed in Patent Literature 1, featuring the indicators arranged at an interval along the longitudinal direction, requires a person to go through a cumbersome process of checking the body-facing surface of the absorbent core, to recognize how much the urine has spread inside the absorbent core. More specifically, a male pet usually urinates with one of its hind legs raised and with the other hind leg staying on the ground. Then, when the pet urinated in this manner has both hind legs placed on the ground thereafter, the urine spreads along the longitudinal direction of the absorbent article. How the urine spreads inside the absorbent core along the longitudinal direction is not uniform among pets, but varies depending on how the pet urinates, the health of the pet, the amount of urine. With the absorbent article disclosed in Patent Literature 1 having the indicators arranged at an interval along the longitudinal direction, a person is difficult to recognize how the urine has spread inside the absorbent core along the longitudinal direction. Thus, a cumbersome checking process is required.

The present invention is directed to an improvement of the conventional absorbent articles for pet animals, and an object of the present invention is to provide an absorbent article enabling how urine has spread inside an absorbent core along a longitudinal direction to be easily recognized.

Solution to Problem

The present invention for solving the problems described above is directed to a rectangular absorbent article for pet animals having a longitudinal direction and a transverse direction and including a body-facing surface facing a body of a pet, a non-body-facing surface opposite to the body-facing surface, a first section positioned at a center in the longitudinal direction, second sections adjacent to the first section in the longitudinal direction, an interior layer sheet positioned on the body-facing surface, an exterior layer sheet positioned on the non-body-facing surface, and an absorbent core interposed between the interior and the exterior layer sheets.

The absorbent article according to the present invention has the following features: the absorbent article includes a first end portion and a second end portion opposed to each other in the longitudinal direction, an attachment on which the second end portion is detachably attached, the attachment being positioned in the first end portion, and an indicator colored upon coming into contact with urine, and the indicator continuously extends in the longitudinal direction, and is visually recognizable from the non-body-facing surface.

Part of the indicator is visually recognizable in side view, in a worn state with the first end portion and the second end portion attached to each other. With such a worn article, whether the pet has urinated can be easily and clearly recognized.

The indicator is positioned in an absorbent area including the absorbent core. In the absorbent article, the absorbent area including the absorbent core is more stiff than the non-absorbent area not including the absorbent core. Thus, the gather is less likely to be produced on the non-body-facing surface side of the indicator, whereby the indicator colored can be visually recognized easily.

The indicator is also positioned in a non-absorbent area not including the absorbent core. With this absorbent article, it can be recognized that the amount of urine absorbed and contained by the absorbent core has reached the upper limit when the indicator positioned in the non-absorbent area is colored.

A portion of the first end portion provided with the attachment is more stiff than a third section not provided with the attachment in the transverse direction, and the indicator is provided on an extension of the first end portion in the longitudinal direction. With this absorbent article, the indicator is positioned further in the longitudinal direction than the stiff attachment. Thus, the gather is less likely to be produced on the non-body-facing surface of the indicator, whereby the indicator colored can be visually recognized easily.

The absorbent article further includes a leakage-barrier sheet provided between the absorbent core and the exterior layer sheet. The leakage-barrier sheet includes a decorated area provided with a graphic and a non-decorated area provided with no graphic. The indicator is overlapped with both decorated area and the non-decorated area in plan view.

In this absorbent article, the decorated area effectively enables the indicator colored in the non-decorated area to be visually recognized.

The indicator has an end portion in the longitudinal direction that is a wide portion or a narrow portion. With this absorbent article, the indicator can be conspicuous in a state where the urine is likely to leak from the article.

The indicator has a length in the longitudinal direction that is equal to or larger than 60% and equal to or smaller than 90% of a length of the absorbent article in the longitudinal direction. With this absorbent article, the urination can be clearly recognized without designing the indicator to be excessively long.

The absorbent article further has a first axis bisecting a length of the absorbent article in the transverse direction, a second axis bisecting a length of the absorbent article in the longitudinal direction. The indicator includes portions extending toward both sides in the longitudinal direction from the second axis and each having a length that is equal to or larger than 30% and equal to or smaller than 45% of a length of the absorbent article in the longitudinal direction. The indicator includes a portion extending upward from a bisecting line bisecting a length in an upper and lower direction of a waist of the pet wearing the absorbent article. With this absorbent article, a distribution of the urine in the absorbent core along the longitudinal direction as well as the urination can be clearly recognized.

Advantageous Effects of Invention

The absorbent article for pet animals according to one or more embodiments of the present invention has the indicator that continuously extending in the longitudinal direction and is visually recognizable form the non-body-facing surface side. Thus, how the urine has spread inside the absorbent core along the longitudinal direction can easily be recognized.

BRIEF DESCRIPTION OF DRAWINGS

The drawings illustrate specific embodiments of the present invention including optional and preferred embodiments as well as essential features of the invention.

DESCRIPTION OF EMBODIMENTS

The embodiments described below relate to an absorbent article as an example of absorbent articles for male pet animals as illustrated in FIG. 1 to FIG. 11, including both optional and preferred features as well as those features which are essential of the present invention.

First Embodiment

Figure 2:
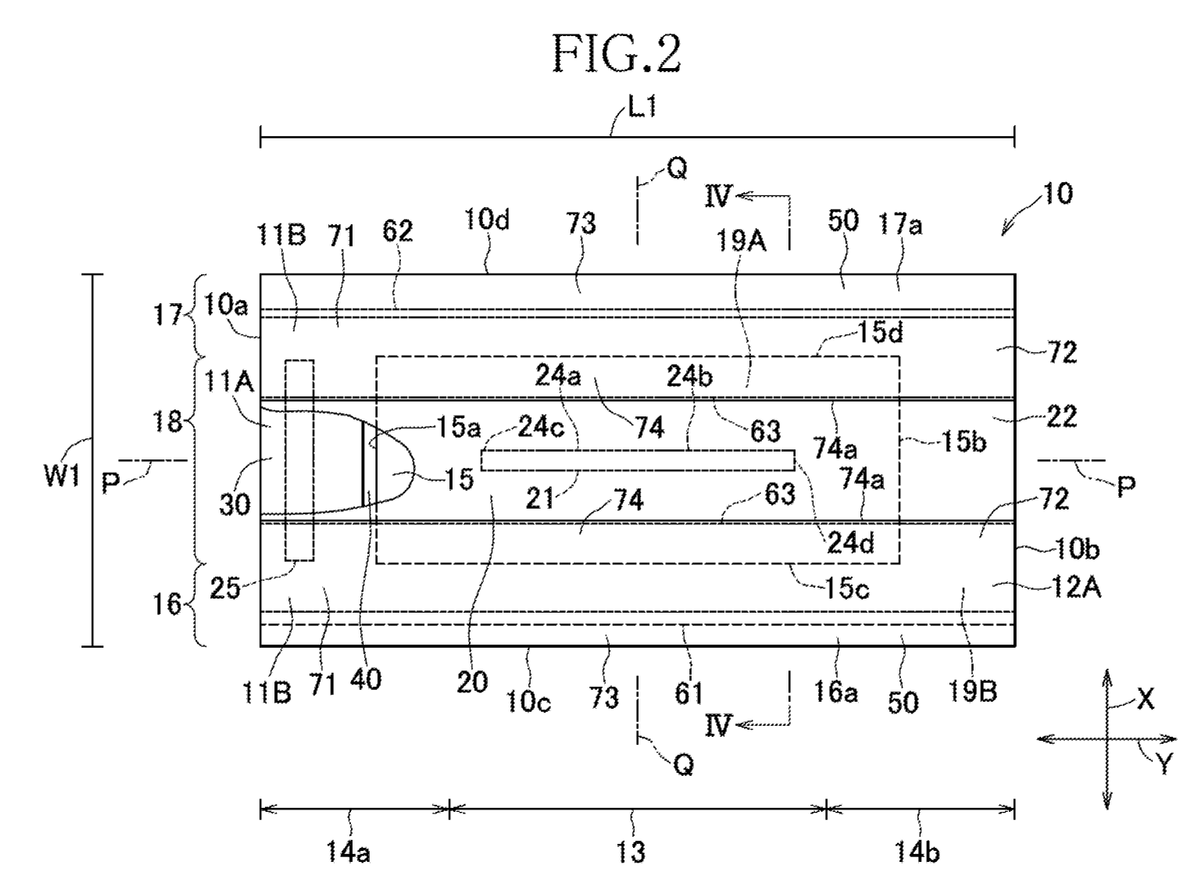
FIG. 2 is a partially cut away development plan view of the absorbent article, expanded in a longitudinal direction and a transverse direction, to the maximum extent allowed by elastic members (until the gather produced by compressing effect of the elastic members disappear), as viewed from a body-facing surface side.
Figure 3:
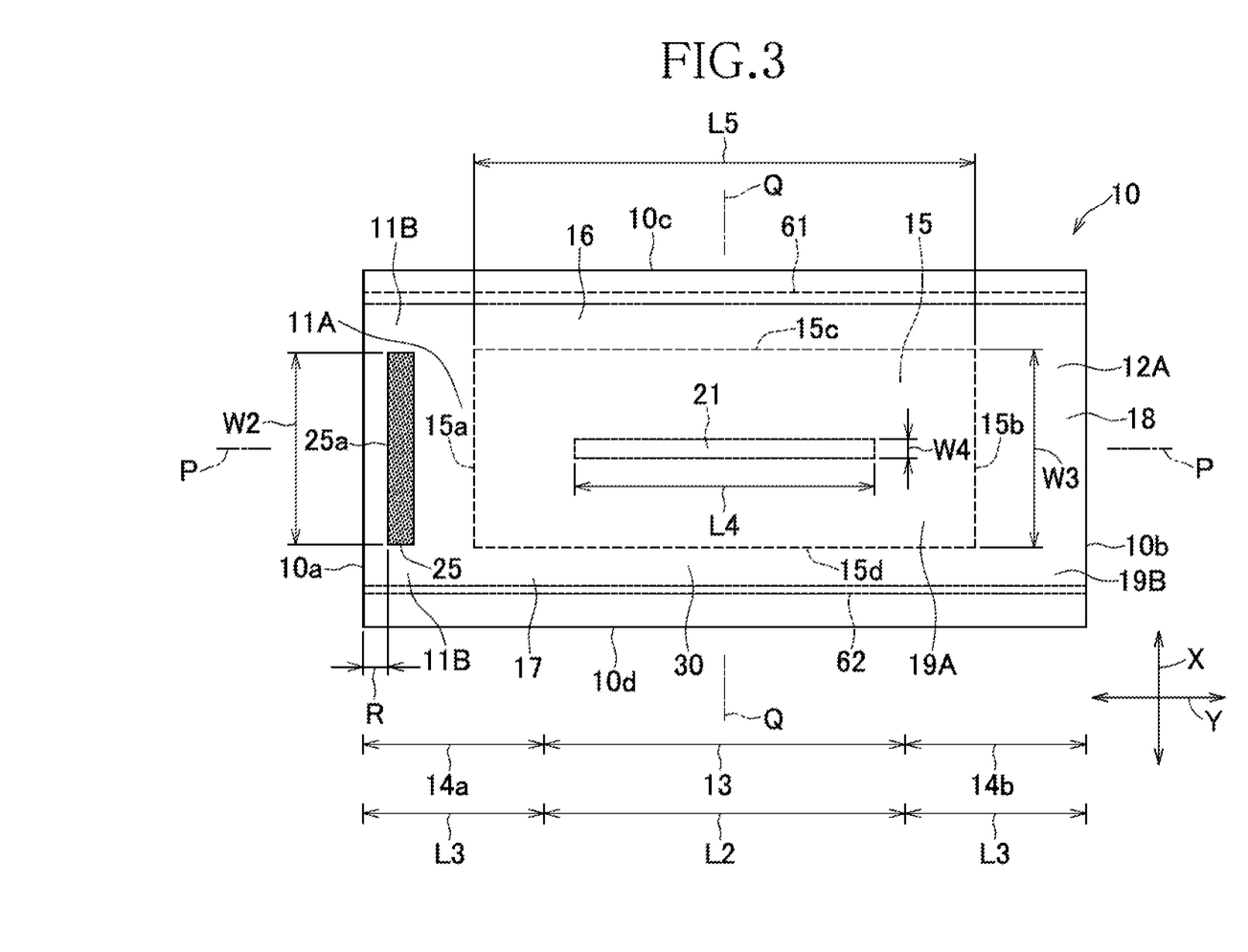
FIG. 3 is a development plan view of the absorbent article in an expanded state, as in FIG. 2, as viewed from a non-body-facing surface side.
Figure 4:
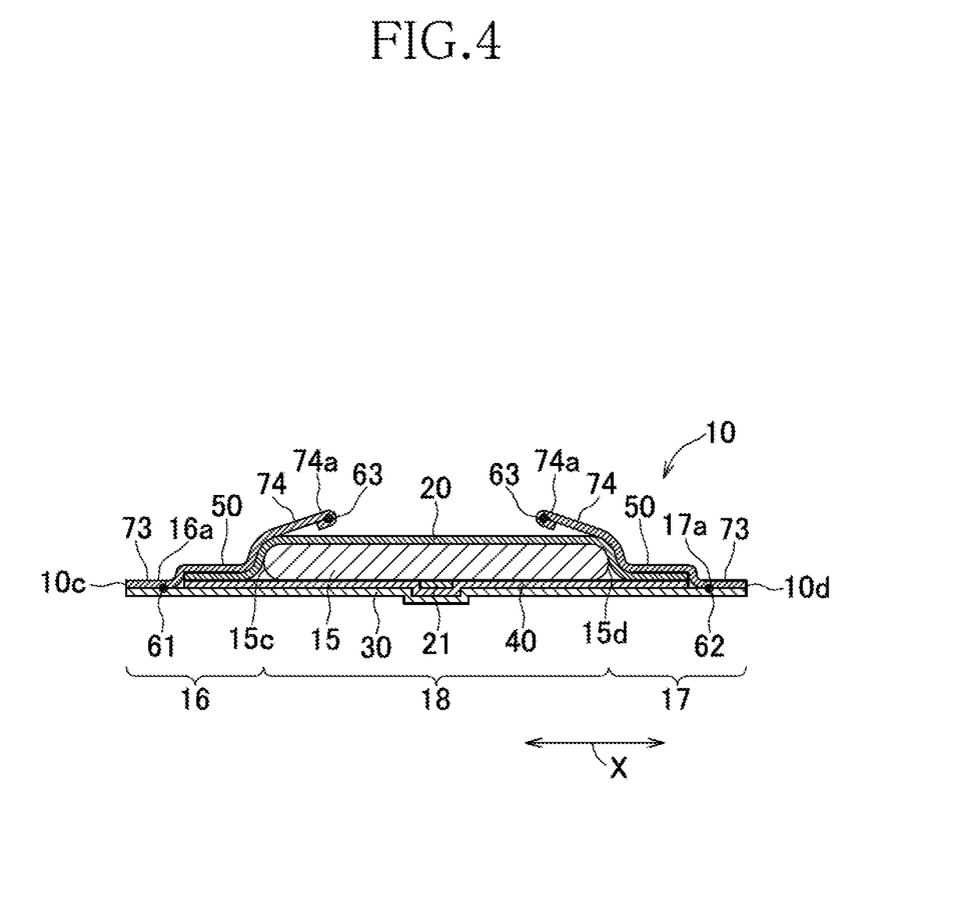
FIG. 4 is a cross-sectional view taken along line IV-IV in FIG. 2.

As illustrated in FIGS. 2 through 4, an absorbent article 10 for pet animals has a longitudinal direction Y, a transverse direction X crossing to each other, a first axis P bisecting a length in the transverse direction X, a second axis Q bisecting a length in the longitudinal direction Y, a body-facing surface facing the body of a pet 5, and a non-body-facing surface opposite to the body-facing surface. The absorbent article 10 has a rectangular shape, elongated in the longitudinal direction Y, defined by first and second edges 10a and 10b and both side edges 10c and 10d between the edges. The first and the second edges 10a and 10b are opposed to each other in the longitudinal direction Y, and both side edges 10c and 10d extend along the longitudinal direction Y. As illustrated in FIG. 2, the absorbent article 10 includes a ventral area facing area (first section) 13 positioned at the center in the longitudinal direction Y and a pair of dorsal area facing areas (second sections) 14a and 14b adjacent to the ventral area facing area in the longitudinal direction Y.

Figure 1:
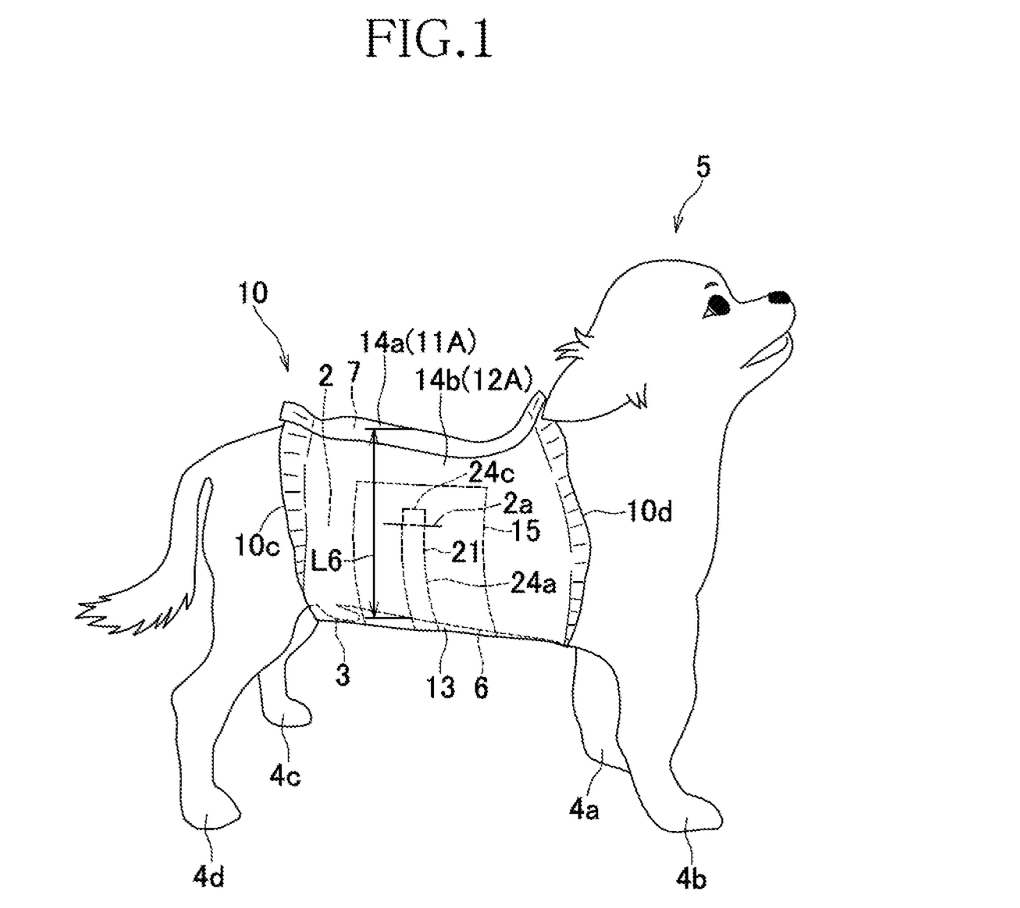
FIG. 1 is a perspective view illustrating a pet wearing an absorbent article according to a first embodiment of the present invention.

For example, when the absorbent article 10 is in a worn state, the ventral area facing area 13 faces the ventral area 6 of the pet 5 and the dorsal area facing areas 14a and 14b face the dorsal area 7 of the pet 5, as illustrated in FIG. 1. The dorsal area facing area 14a includes a first end portion 11A described later, and the dorsal area facing area 14b includes a second end portion 12A described later.

As illustrated in FIG. 3, one dorsal area facing area 14, which is one of the pair of dorsal area facing areas 14a and 14b, has a non-body-facing surface (outer surface) provided with an attachment 25 attached to the other one of the dorsal area facing areas 14a and 14b is detachably attached. As illustrated in FIG. 2, the other dorsal area facing area 14, which is the other one of the dorsal area facing areas 14a and 14b, has a body-facing surface (inner surface) provided with an attachment target part 22 to which the attachment 25 is attached. Alternatively, the attachment target part 22 may be provided on the non-body-facing surface.

In FIG. 2 and FIG. 3, the absorbent article 10 has, for example, a length L1, which is approximately 300 to 1000 mm, in the longitudinal direction Y and a length W1, which is approximately 80 to 500 mm, in the transverse direction X. The ventral area facing area 13 has a length L2, which is approximately 150 to 500 mm, in the longitudinal direction Y. Each of the pair of dorsal area facing areas 14a and 14b has a length L3, which is 75 to 250 mm, in the longitudinal direction Y.

The absorbent article 10 further includes a liquid-permeable interior layer sheet 20, a liquid-impermeable exterior layer sheet 30, and an absorbent core 15. The liquid-permeable interior layer sheet 20 is positioned on the body-facing surface. The liquid-impermeable exterior layer sheet 30 may be made of a moisture-permeable plastic film, a fibrous nonwoven fabric, a laminate sheet including these, and is positioned on the non-body-facing surface. The absorbent core 15 is positioned at least in the ventral area facing area 13 and is interposed between the interior and exterior layer sheets 20 and 30. A leakage-barrier sheet 40 is provided between the absorbent core 15 and the exterior layer sheet 30, and may be made of a non-liquid permeable and moisture permeable plastic film. The interior and exterior layer sheets 20 and 30 and the leakage-barrier sheet 40 extend beyond a circumference edge of the absorbent core 15. Outward extending portions of the sheets 20, 30, and 40, overlapped with each other, are adhered to each other with hotmelt adhesives applied to an interior surface(s) of at least one of the sheets facing each other.

The absorbent article 10 has the body-facing surface (or the body-facing surface of the interior layer sheet 20) provided with a pair of cover sheets 50 extending in the longitudinal direction Y along the first and the second side edges 10c and 10d. The cover sheet 50 may be made of a liquid-permeable or liquid-impermeable fibrous nonwoven fabric, a plastic film, a laminate sheet including these. The cover sheets 50 has portions, on the inner side in the transverse direction X, covering the interior layer sheet 20, and being fixed to each other with hotmelt adhesives (not illustrated), through the outward extending portions of the exterior layer sheet 30, extending outward beyond both side edges of the interior layer sheet 20 in the transverse direction X. As described above, the cover sheets 50 cover both side edge portions of the interior layer sheet 20, and the absorbent article 10 has both side edge portions made of liquid-impermeable sheets. Thus, urine discharged from the both side edges of the interior layer sheet 20 can be prevented from leaking out.

The absorbent core 15 has a rectangular shape contoured by both edges 15a and 15b and both side edges 15c and 15d between these edges. Both edges 15a and 15b are opposite to each other in the longitudinal direction Y. Both side edges 15c and 15d extend in the longitudinal direction Y. The absorbent core 15 may be made of a mixture including materials known as superabsorbent polymer (SAP) particles and wood fluff pulp, and optionally including a small amount of thermoplastic fibers. The SAP is insoluble and features excellent water absorbency (capable of absorbing water in an amount that is 10 times as much as its mass or more). The absorbent core 15 is covered with a core cover sheet (not illustrated) made of nonwoven fabrics or tissue paper having hydrophilicity and liquid diffusing property. The core cover sheet is adhered to the interior layer sheet 20 and/or the leakage-barrier sheet 40 with hotmelt adhesives.

As illustrated in FIG. 2 and FIG. 3, the absorbent article 10 includes first and second side areas (both side areas) 16 and 17 and an intermediate area 18 positioned between the first and the second side areas 16 and 17 in the transverse direction X. The first and the second side areas 16 and 17 are positioned more on the outer side than both side edges 15c and 15d of the absorbent core 15 in the transverse direction X and extend in the longitudinal direction Y. Elastic members (a first elastic member 61 and a second elastic member 62) are secured between the exterior layer sheet 30 and the cover sheet 50, in the first and the second side areas 16 and 17, in a contractible manner under tension. The elastic member is in a string form or a strand form, and extends in the longitudinal direction Y. The first and the second side areas 16 and 17 include side edges 16a and 17a where elastic portions are formed. Contracting force of the elastic members 61 and 62 is applied to the elastic portions. Thus, in a worn state, the side edges 16a and 17a may be frilled.

As illustrated in FIG. 2, the cover sheet 50 includes both end fixed portions 71 and 72, fixed side portions (proximal portions) 73, and free portions 74. Both end fixed portions 71 and 72 are fixed to the interior layer sheet 20 respectively on the first edge 10a and the second edge 10b. The fixed side portions 73 extend in the longitudinal direction Y between both end fixed portions 71 and 72 and are fixed to the interior layer sheet 20. The free portions 74 are positioned on inner sides (sides closer to the first axis P) of the fixed side portions 73 in the transverse direction X. The free portions 74 have free edges 74a, in a sleeve form, formed by folding side edge portions of the cover sheet 50. Third elastic members (cuff elastic members) 63 are secured in a corresponding one of the free edges 74a in a contractible manner under tension. In the worn state of the absorbent article 10, the third elastic members 63 are stretched so that the free portions 74 may space apart from the interior layer sheet 20, whereby a pair of upstanding cuffs (barrier cuffs) are formed. With the upstanding cuffs formed, urine can be prevented from flowing toward forelegs 4a and 4b and hind legs 4c and 4d (see FIG. 1). The free portions 74 of the cover sheet 50 are fixed to the body-facing surface of the interior layer sheet 20 with the both end fixed portions 71 and 72, on both ends in the longitudinal direction Y, positioned in the first and the second side areas 16 and 17.

Unlike in the present embodiment, the free portions 74 of the cover sheet 50 may have at least one of both end fixed portions 71 and 72 in the transverse direction X not fixed to the interior sheet 27. When both end fixed portions 71 and 72 are not fixed, the free portions 74 of the cover sheet 50 can entirely extend in an inclined manner toward the inner side and/or the outer side in the transverse direction X, and can be arranged proximal to or distant from the interior sheet 20. Thus, male genitalia 3 can be easily positioned between a pair of free edges 74a in the transverse direction, when the absorbent article 10 is put on the pet 5 as described below.

Figure 5:
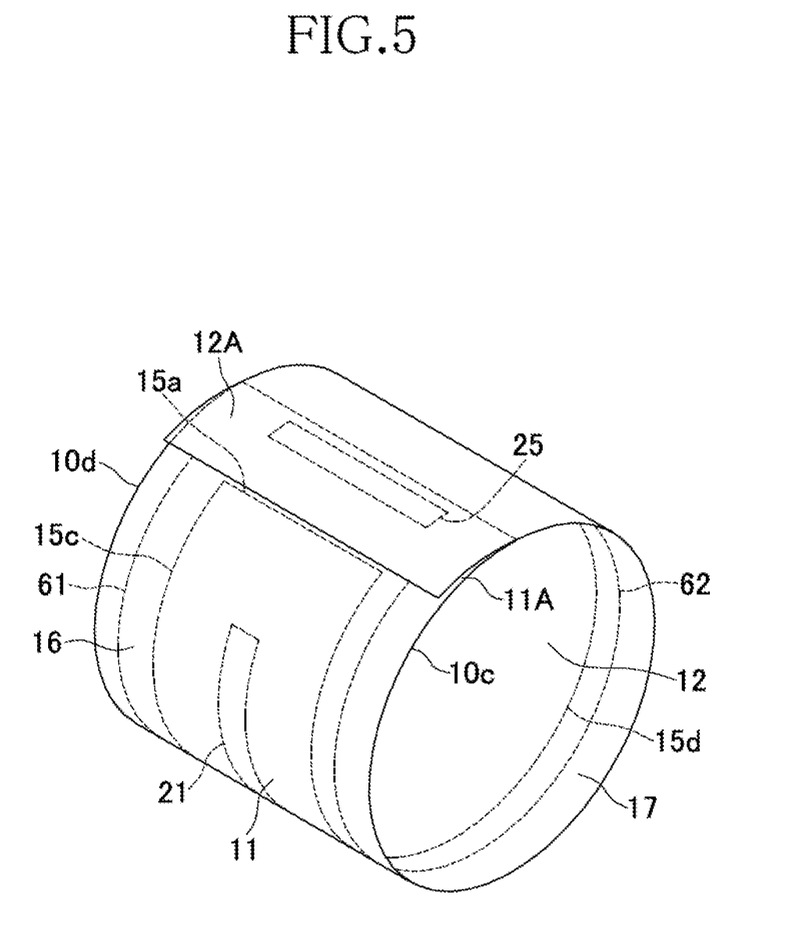
FIG. 5 is a perspective view illustrating a state where a first end portion and a second end portion are attached to each other.

As illustrated in FIG. 2 and FIG. 3, the absorbent article 10 includes a first end portion 11A and a second end portion 12A opposite to each other in the longitudinal direction Y. The attachment 25 is provided in an end portion 11A (the one dorsal area facing area 14a) between the edge 15a of the absorbent core 15 and the edge 10a of the absorbent article 10, in the non-body facing surface. For example, the attachment 25 has a rectangular shape, and includes a base sheet attached to the outer surface of the exterior layer sheet 30 and a fastening element formed of hooks of a mechanical fastener fixed to the base sheet. The attachment target part 22 is provided in an end portion 12A (the other dorsal area facing area 14b) between the edge 15b of the absorbent core 15 and the edge 10b of the absorbent article 10, in the body facing surface. The attachment target part 22 may be formed of fiber nonwoven fabrics forming the interior layer sheet 20. A portion where the attachment target part 22 is formed may be embossed or a non-embossed spun-bound fiber nonwoven fabric, including long fibers, may be used as the interior layer sheet 20. This facilitates the engagement of the hook element of the attachment 25. A target sheet including loops of the mechanical fastener may be provided in an area of the interior layer sheet 20 corresponding to the position of the attachment target part 22. The attachment 25 may be adhesive covered with a separator with a surface coated with silicon, instead of hooks, as long as predetermined attachment strength between the attachment 25 and the attachment target part 22 can be ensured, as illustrated in FIG. 5.

As illustrated in FIG. 3, the attachment 25 has a length W2, in the transverse direction, set to be the same as a length W3 of the absorbent core 15 in the transverse direction, for example. In the first end portion 11A, a portion provided with the attachment 25 is more stiff than a third section 11B not provided with the attachment 25, in the transverse direction X. The attachment 25 has an edge 25a that is opposite to the edge 10a of the absorbent article 10 and is positioned more on the inner side than the edge 10a of the absorbent article 10 in the longitudinal direction Y. The edges 10a and 25a have a separated portion between with a length R of approximately 3 to 50 mm in the longitudinal direction Y. With this configuration of the absorbent article 10, the separated portion can serve as a holding portion in an operation of attaching the attachment 25, while holding the end portion 11A, to the attachment target part 22 positioned in the end portion 12A. This ensures no risk of a fingertip directly touching the fastening element of the attachment 25 resulting in the skin becoming irritated.

The attachment 25 is positioned on the first axis P in the one dorsal area facing area 14a while being symmetrical relative to the first axis P. The attachment 25 positioned on the first axis P ensures more balanced connection between the first end portion 11A and the second end portion 12A, compared to the case where the attachment 25 is arranged on one side of the first axis P, closer to any one of the first side portion 16 and the second side portion 17.

As illustrated in FIG. 4, an indicator 21 that is colored upon coming into contact with urine of the pet 5 is provided between the absorbent core 15 and the leakage-barrier sheet 40. As illustrated in FIG. 2 and FIG. 3, the indicator 21 is positioned only in an absorbent area 19A, including the absorbent core 15, and continuously extends in the longitudinal direction Y. For example, this indicator 21 is positioned at the center in the longitudinal direction Y and in the transverse direction X. The exterior layer sheet 30 and the leakage-barrier sheet 40 are fully transparent to light so that the indicator 21 can be visually recognized from the non-body-facing surface. The indicator 21 includes an ink layer that is colored upon coming into contact with a water content of the urine, and optionally includes a cover sheet including surfactant agent. The indicator 21 has a length W4 in the transverse direction that is smaller than any one of the length W3 of the absorbent core 15 in the transverse direction and the length W2 of the attachment 25 in the transverse direction. The indicator 21 has a length L4 that is smaller than the length L5 of the absorbent core 15, and is equal to or larger than 60% and equal to or smaller than 90% of the length L1 of the absorbent article 10. As described above, the indicator 21 is provided at the center in the longitudinal direction Y, and is of a predetermined rate to the length L1 of the absorbent article 10. Specifically, the indicator 21 includes portions 24a and 24b that each extend in the longitudinal direction Y from the second axis Q, each have a length that is equal to or larger than 30% and equal to or smaller than 45% of the length L1 of the absorbent article 10 in the longitudinal direction Y (see FIG. 2).

As illustrated in FIG. 1, the absorbent article 10 is put on the pet 5 as follows for example. Specifically, the first dorsal area facing area 14a is pressed against the dorsal area 7 of the pet 5 standing with its four legs 4a, 4b, 4c, and 4d. Then, the ventral area facing area 13 is pressed against the ventral area 6 between the forelegs 4a and 4b and the hind legs 4c and 4d. In this process, the tip of the genitalia 3 of the pet 5 is positioned between the pair of free edges 74a in the transverse direction X. Then, the first end portion 11A and the second end portion 12A are attached to each other with the attachment target part 22 pressed against and attached to the attachment 25, while pulling up the other dorsal area facing area 14b. In this worn state, a part of the indicator 21 can be visually recognized in side view, as illustrated in FIG. 1. The pet 5 wearing the absorbent article 10 has the portion between the forelegs 4a and 4b and the hind legs 4c and 4d covered with the absorbent article 10, and the male genitalia 3 also covered with the absorbent article 10. After the absorbent article 10 has been put on, urine discharged from the genitalia 3 of the pet 5 moves to the pair of free edges 74a to be absorbed and contained by the absorbent core 15 through the interior layer sheet 20. When the urine is exuded to the indicator 21 from the non-body-facing surface of the absorbent core 15, the ink layer of the indicator 21 is colored by the water content of the urine.

The absorbent article 10 for the pet 5 according to the present invention has the indicator 21 continuously extending in the longitudinal direction Y, whereby how the urine has spread can be recognized in the outer view. More specifically, a small amount of urine discharged results in only a lower portion of the indicator 21 being colored, and a large amount of urine discharged results in an upper portion of the indicator 21 further being colored. Thus, how much the urine has spread inside the absorbent 15 can be recognized. The pet 5 that is a male dog generally urinates with one of the hind legs 4c and 4d raised with the other one of the hind legs 4c and 4d staying on the ground. The urine thus discharged in a state described above spreads along the longitudinal direction Y of the absorbent article 10, when both hind legs 4c and 4d are placed on the ground thereafter. This absorbent article 10 has the indicator 21 extending in the longitudinal direction Y so that how the urine of the male dog is spreading can be recognized.

Furthermore, a part of the indicator 21 can be visually recognized from the non-body-facing surface in side view of the absorbent article 10 according to the present embodiment in the worn state. Thus, whether the pet 5 has urinated can be easily recognized. A part of the indicator 21 can be visually recognized from both sides of the pet 5.

The length L4 of the indicator 21 is equal to or larger than 60% of the length L1 of the absorbent article 10. This ensures the recognition of the urination. The indicator 21 has the length L4 that is equal to or smaller than 90% of the length L1 of the absorbent article 10 so as not to be excessively long.

The indicator 21 includes the portions 24a and 24b and portions 24c and 24d. The portions 24a and 24b extend toward both sides in the longitudinal direction Y from the second axis P, and each have a length that is equal to or larger than 30% and equal to or smaller than 45% of the length of the absorbent article 10 in the longitudinal direction Y. The portions 24c and 24d extend upward from a bisecting line 2a that bisects a length L6 of a waist 2 of the pet 5 in the worn state as illustrated in FIG. 1 (see FIG. 2). Thus, this ensures recognition of the urination and the distribution of the urine in the longitudinal direction Y.

The indicator 21 is positioned only in the absorbent area 19A including the absorbent core 15. The absorbent area 19A including the absorbent core 15 is more stiff than the non-absorbent area 19B not including the absorbent core 15. Thus, the gather is less likely to be produced on the non-body-facing surface of the indicator 21, whereby the indicator 21 that has been colored can be easily recognized.

The portion of the first end portion 11A provided with the attachment 25 is more stiff than the third section 11B not provided with the attachment 25 in the transverse direction. The indicator 21 is positioned on an extension of the first end portion 11A in the longitudinal direction Y. Thus, the indicator 21 is positioned on one side of the longitudinal direction Y relative to the stiff attachment 25. Thus, the gather is less likely to be produced on the non-body-facing surface of the indicator 21, whereby the indicator 21 can be more easily visually recognized.

Second Embodiment

Figure 6:
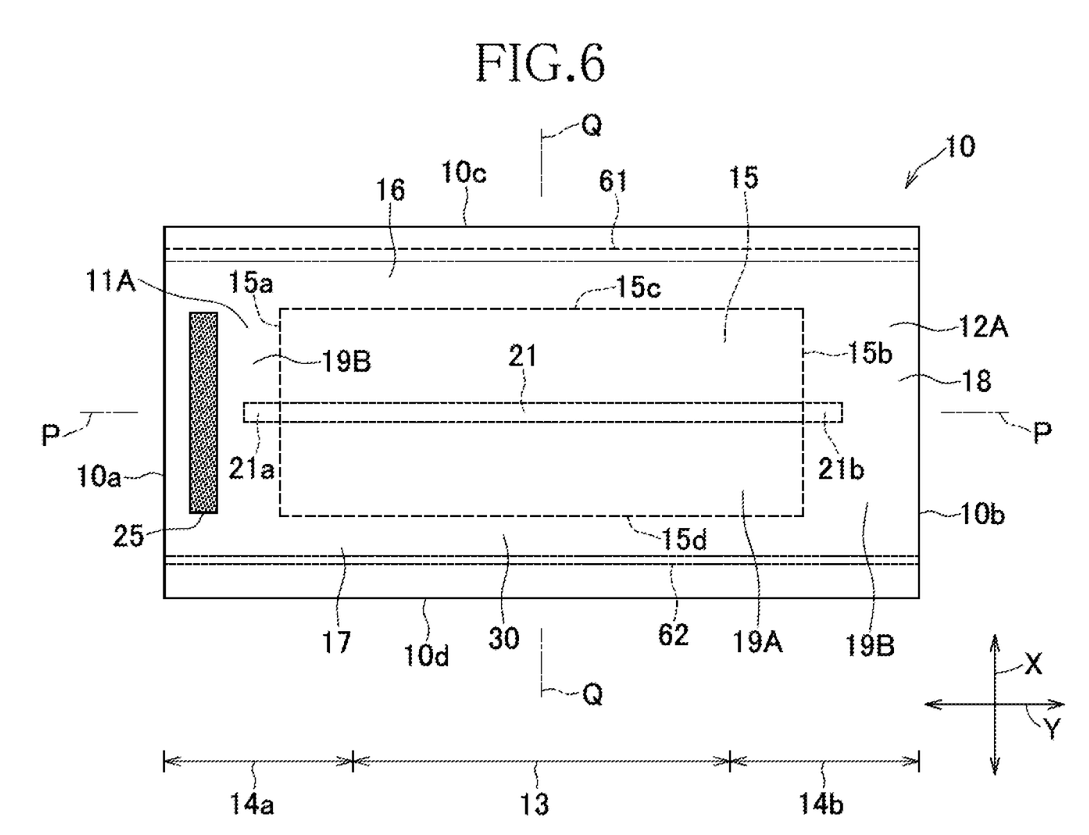
FIG. 6 is a development plan view of an absorbent article according to a second embodiment in an expanded state as in FIG. 3.
Figure 7:
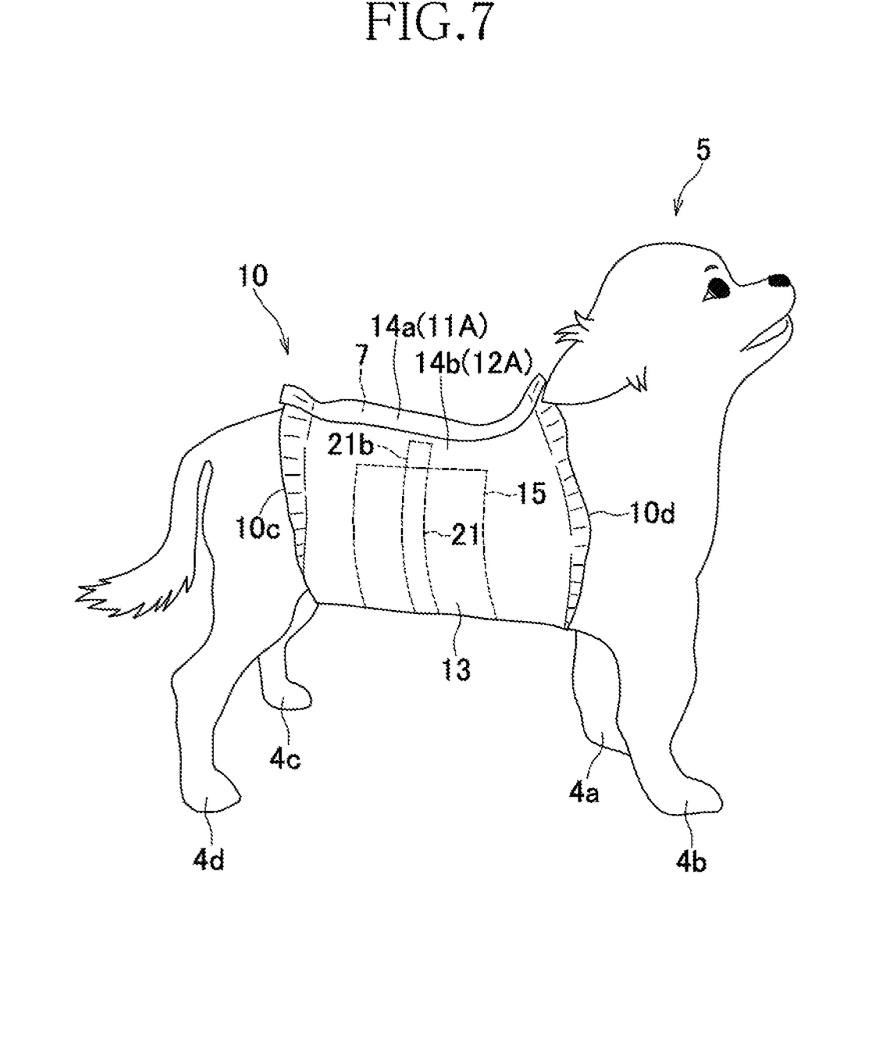
FIG. 7 is a perspective view, as in FIG. 1, illustrating the absorbent article according to the second embodiment.

FIG. 6 is a development plan view of an absorbent article 10 according to a second embodiment in an expanded state as in FIG. 3. FIG. 7 is a perspective view, as in FIG. 1, illustrating the absorbent article 10 according to the second embodiment. Only a difference from the first embodiment will be described below.

As illustrated in FIG. 6 and FIG. 7, the indicator 21 continuously extends outboard of both edges 15a and 15b of the absorbent core 15 in the longitudinal direction Y, and has end portions 21a and 21b, in the longitudinal direction Y, also positioned in the non-absorbent area 19B without the absorbent core 15.

This absorbent article 10 enables the user to recognize that the amount of urine absorbed and contained in the absorbent core 15 reached the upper limit when any one of the end portions 21a and 21b of the indicator 21 is colored.

Third Embodiment

Figure 8:
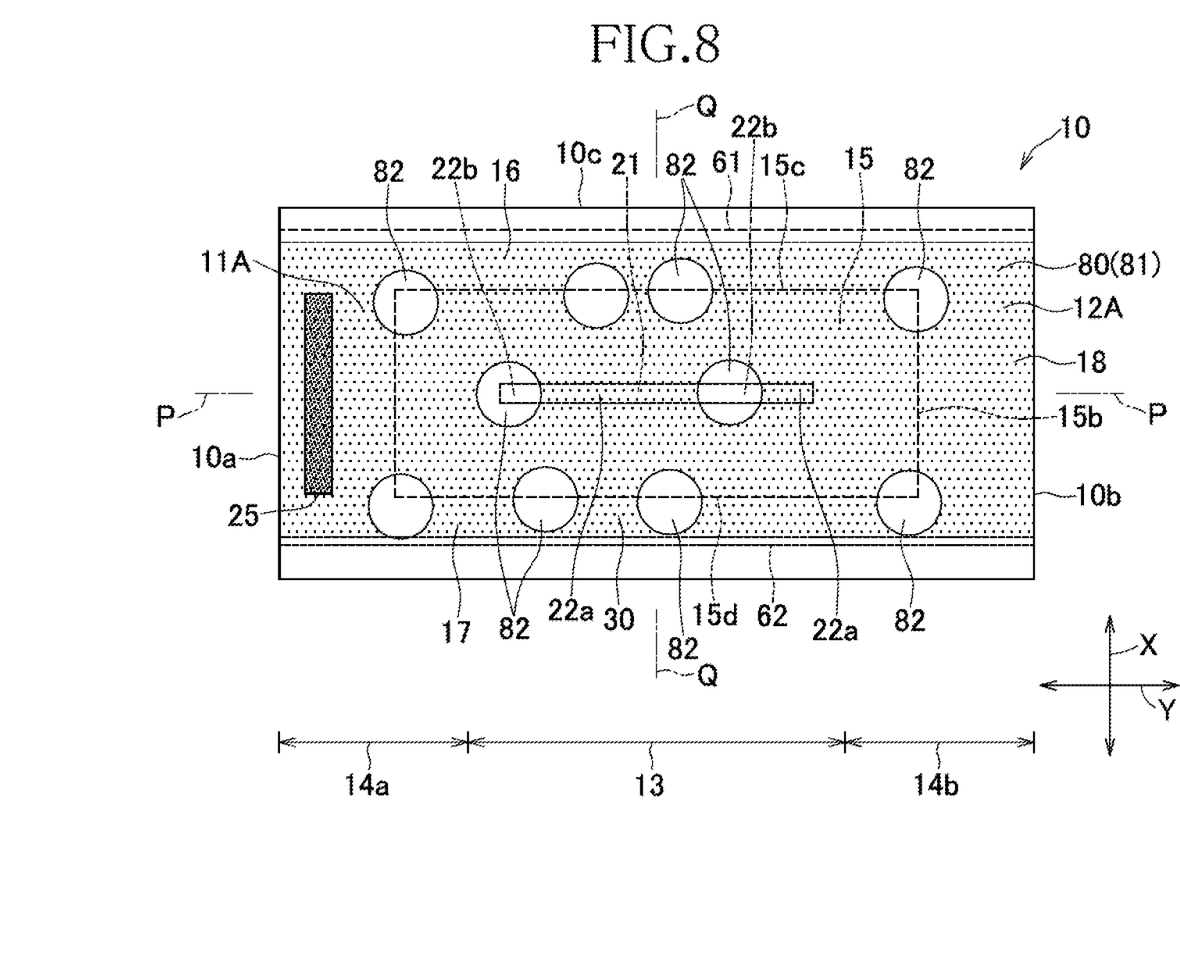
FIG. 8 is a development plan view of an absorbent article according to a third embodiment in an expanded state as in FIG. 3.
Figure 9:
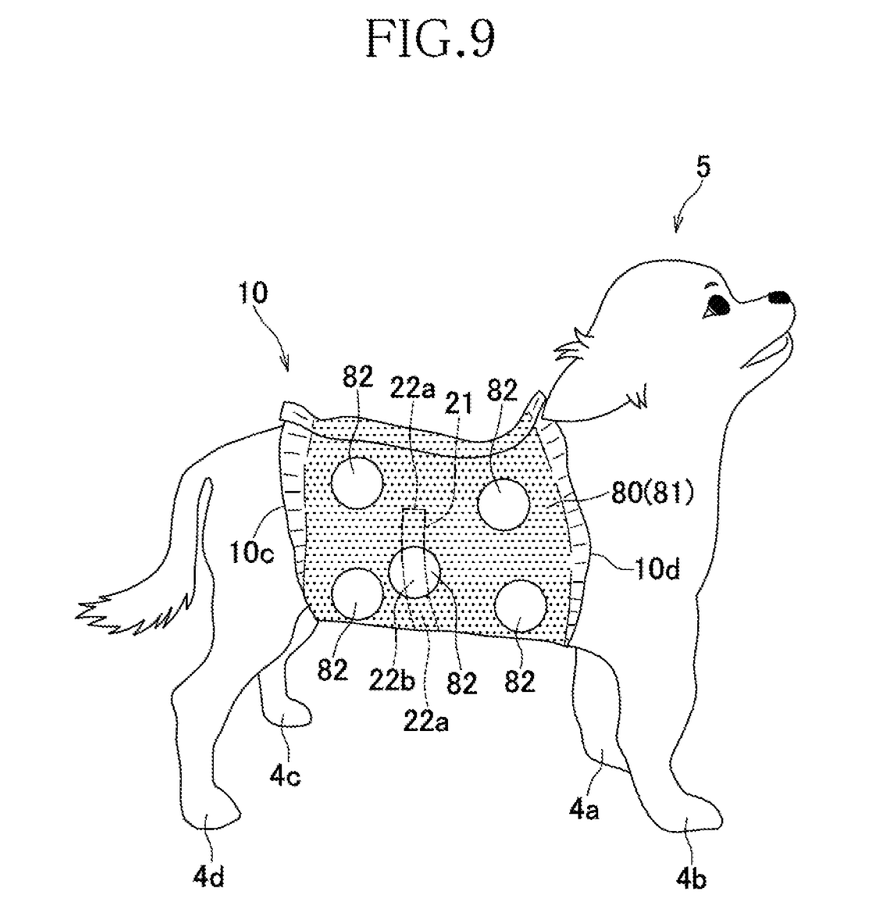
FIG. 9 is a perspective view, as in FIG. 1, illustrating the absorbent article according to the third embodiment.

FIG. 8 is a development plan view of an absorbent article 10 according to a third embodiment in an expanded state as in FIG. 3. FIG. 9 is a perspective view, as in FIG. 1, illustrating the absorbent article 10 according to the third embodiment. Only a difference from the embodiments described above will be described below.

The leakage-barrier sheet 40 has the non-body-facing surface provided with a graphic 80. This non-body-facing surface includes a decorated area 81 (hatched area in FIG. 8) provided with the graphic 80 and non-decorated areas 82 (non-hatched area in FIG. 8) without the graphic 80. The indicator 21 includes first part 22a overlapping with the decorated area 81 and second part 22b overlapping with the non-decorated area 82, in plan view. In this absorbent article 10, the decorated area 81 effectively enables the second part 22b of the indicator 21 colored in the non-decorated area 82 to be more visually recognized.

The graphic 80 may be provided on the body-facing surface of the leakage-barrier sheet 40, or may be provided on any one of the body-facing surface and the non-body-facing surface of the exterior layer sheet 30 instead of being provided on the leakage-barrier sheet 40.

The color of the graphic 80 may be the same as the color of the indicator 21 that has been colored. Thus, the indicator 21 that has been colored can be inconspicuous due to the graphic 80 in the decorated area 81.

<Modification>

Figure 10:
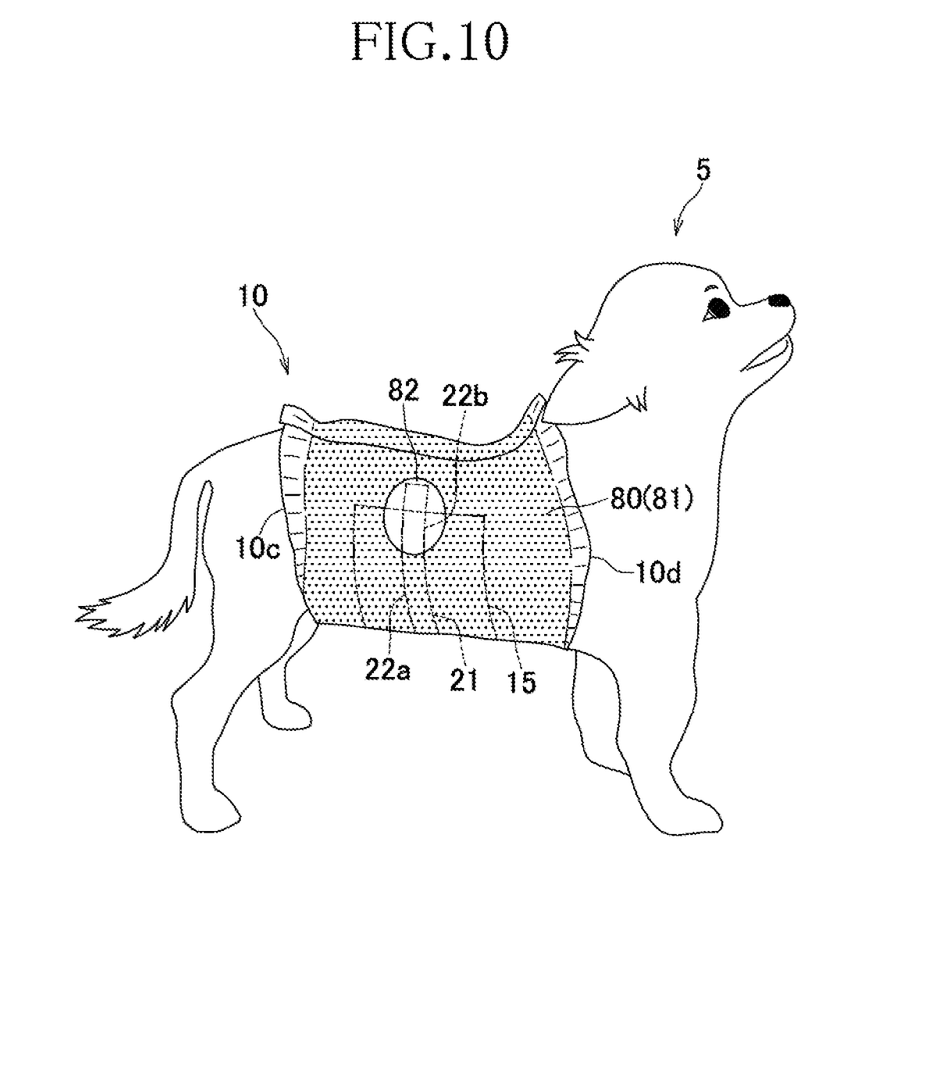
FIG. 10 is a perspective view, as in FIG. 1, illustrating an absorbent article according to a modification of the third embodiment.

FIG. 10 is a perspective view, as in FIG. 9, illustrating an absorbent article 10 according to a modification of the third embodiment. Only a difference from the third embodiment is described below.

The indicator 21 has the second portions 22b overlapping with the non-decorated areas 82 only on both ends in the longitudinal direction Y, and has the remaining portion serving as the first portion 22a overlapping with the decorated area 81. In the absorbent article 10, the first portion 22a of the indicator 21 positioned on the lower side is colored when the pet 5 discharges a small amount of urine. The first portion 22a is positioned in the decorated area 81, so as not to be conspicuous. In this state, the urine can still be absorbed and contained in upper portions of the absorbent core 15. When the amount of urine absorbed and contained in the absorbent core 15 is close to the upper limit, the second portions 22b of the indicator 21 are colored. The second portion 22b is provided on the non-decorated area 82 and clearly indicates that the amount of urine absorbed and contained in the absorbent core 15 is close to the upper limit.

Fourth Embodiment

Figure 11:
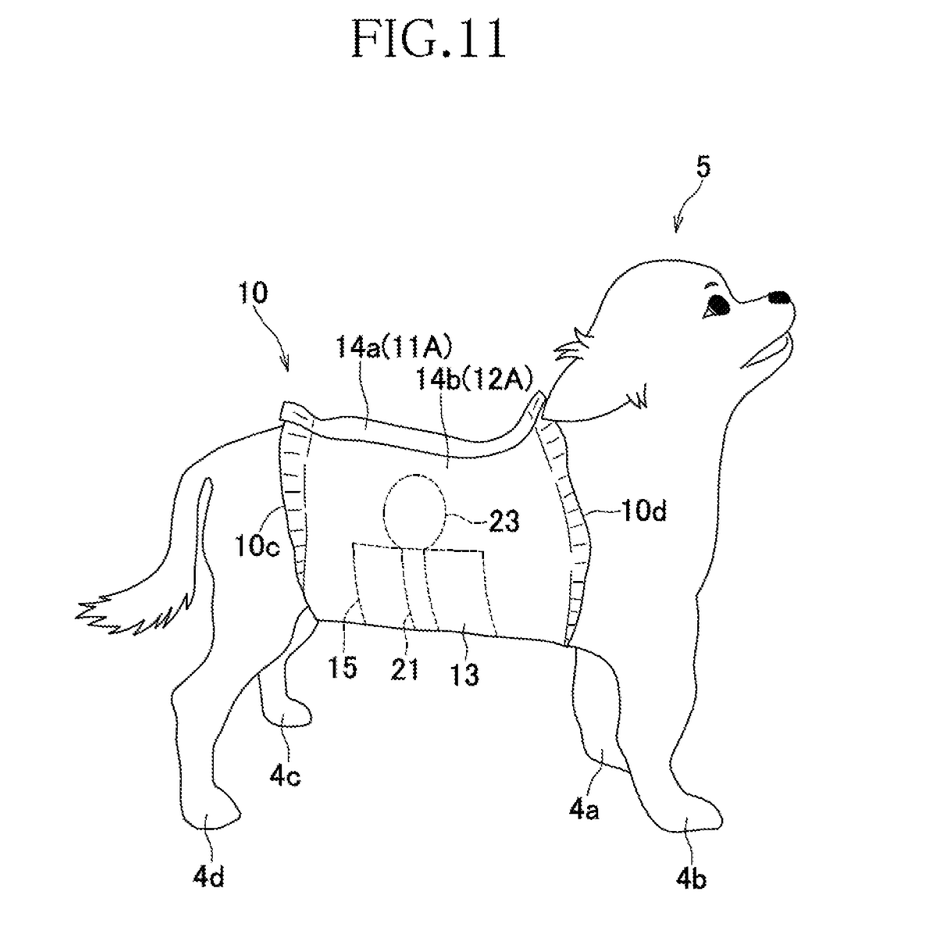
FIG. 11 is a perspective view, as in FIG. 1, illustrating an absorbent article according to a fourth embodiment.

FIG. 11 is a perspective view as in FIG. 1 illustrating an absorbent article 10 according to a fourth embodiment. A difference from the embodiments described above is described below.

The indicator 21 includes wide portions 23 at both ends in the longitudinal direction Y. With this absorbent article 10, the end portions of the indicator 21 can be conspicuous when the urine is likely to leak from the absorbent article 10.

The indicator 21 may include narrow portions instead of the wide portion 23 at both end portions.

The absorbent articles according to the embodiments described above have the exterior layer sheet 30 having low liquid impermeability. However, the present invention is not limited to this, and the exterior layer sheet 30 may be liquid impermeable.

In the embodiments described above, the length W2 of the attachment 25 in the transverse direction is the same as the length W3 of the absorbent core 15 in the transverse direction. However, the present invention is not limited to this. The length W2 of the attachment 25 in the transverse direction may be larger than the length W3 of the absorbent core 15 in the transverse direction.

The embodiments described above may be individually implemented or may be combined to be implemented.

The components of the absorbent article 10 are not limited to those described in this description, and known materials generally used in this technical field may be used, unless otherwise noted. The terms used in this specification, such as "first", "second", and "third", are used merely for the distinction between similar elements, positions.

REFERENCE SIGNS LIST 5 pet animal
10 absorbent article for pet animal
11A first end portion
12A second end portion
11B third area
13 ventral area facing area (first section)
14 dorsal area facing area (second section)
15 absorbent core
15a edge of absorbent core
15b edge of absorbent core
19A absorbent area
19B non-absorbent area
20 interior layer sheet
21 indicator
21a end portion of indicator
21b end portion of indicator
22a first portion of indicator
22b second portion of indicator
23 wide portion of indicator 24a portion of indicator that is equal to or larger than 30% and equal to or smaller than 45% of length of absorbent article in longitudinal direction
24b portion of indicator that is equal to or larger than 30% and equal to or smaller than 45% of length of absorbent article in longitudinal direction
24c portion of indicator extending upward from bisecting line bisecting length of waist of pet in upper and lower direction
24d portion of indicator extending upward from bisecting line bisecting length of waist of pet in upper and lower direction
25 attachment
30 exterior layer sheet
40 leakage-barrier sheet
80 graphic
81 decorated area
82 non-decorated area
L1 length of absorbent article (length of absorbent article in longitudinal direction)
L4 length of indicator (length of indicator in longitudinal direction)
X transverse direction (transverse direction)
Y longitudinal direction (longitudinal direction)

The invention claimed is:

1. An absorbent article for male pet animals, the absorbent article having a longitudinal direction and a transverse direction and comprising:
a body-facing surface configured for facing a body of a pet;
a non-body-facing surface opposite to the body-facing surface;
a first section positioned at a center of the absorbent article in the longitudinal direction;
second sections adjacent to the first section in the longitudinal direction;
an interior layer sheet positioned on the body-facing surface;
an exterior layer sheet positioned on the non-body-facing surface;
an absorbent core interposed between the interior and the exterior layer sheets;
a leakage-barrier sheet provided between the absorbent core and the exterior layer sheet;
a first end portion and a second end portion opposed to each other in the longitudinal direction;
an attachment on which the second end portion is detachably attached, the attachment being positioned in the first end portion; and
an indicator that is configured to be colored upon coming into contact with urine, wherein
the indicator continuously extends in the longitudinal direction, and is visually recognizable from the non-body-facing surface,
the indicator has end portions in the longitudinal direction,
the leakage-barrier sheet includes a decorated area provided with a graphic and a non-decorated area not provided with the graphic,
the indicator has the end portions overlapping the non-decorated area and a remaining intermediate portion overlapping the decorated area, and
in a state that the absorbent article is worn, each of the end portions of the indicator includes a top edge overlapping the non-decorated area, wherein only the top edges of the end portions of the indicator overlap the non-decorated area.

2. The absorbent article according to claim 1, wherein a part of the indicator is visually recognizable in a side view, in the state that the absorbent article is worn and the first end portion and the second end portion are attached to each other.

3. The absorbent article according to claim 2 further having a first axis bisecting a length width of the absorbent article in the transverse direction, a second axis bisecting a length of the absorbent article in the longitudinal direction,
wherein the indicator includes portions extending toward both sides in the longitudinal direction from the second axis and each having a length that is equal to or larger than 30% and equal to or smaller than 45% of a length of the absorbent article in the longitudinal direction, and
wherein the indicator includes a portion extending upward from a bisecting line bisecting a length in an upper and lower direction of a waist of the pet wearing the absorbent article.

4. The absorbent article according to claim 1, wherein the indicator is positioned in an absorbent area including the absorbent core.

5. The absorbent article according to claim 4, wherein the indicator is also positioned in a non-absorbent area not including the absorbent core.

6. The absorbent article according to claim 1,
wherein a portion of the first end portion provided with the attachment is more stiff than a third section not provided with the attachment in the transverse direction, and
wherein the indicator is provided on an extension of the first end portion in the longitudinal direction.

7. The absorbent article according to claim 1, wherein the indicator has a length in the longitudinal direction that is equal to or larger than 60% and equal to or smaller than 90% of a length of the absorbent article in the longitudinal direction.

* * * * *